March 26, 1968     D. W. KERMODE     3,375,376
ANTI-INTRUDER DEVICE USING VIBRATION RESPONSIVE
MEMBER BETWEEN LIGHT AND PHOTOCELL
Filed Feb. 20, 1964
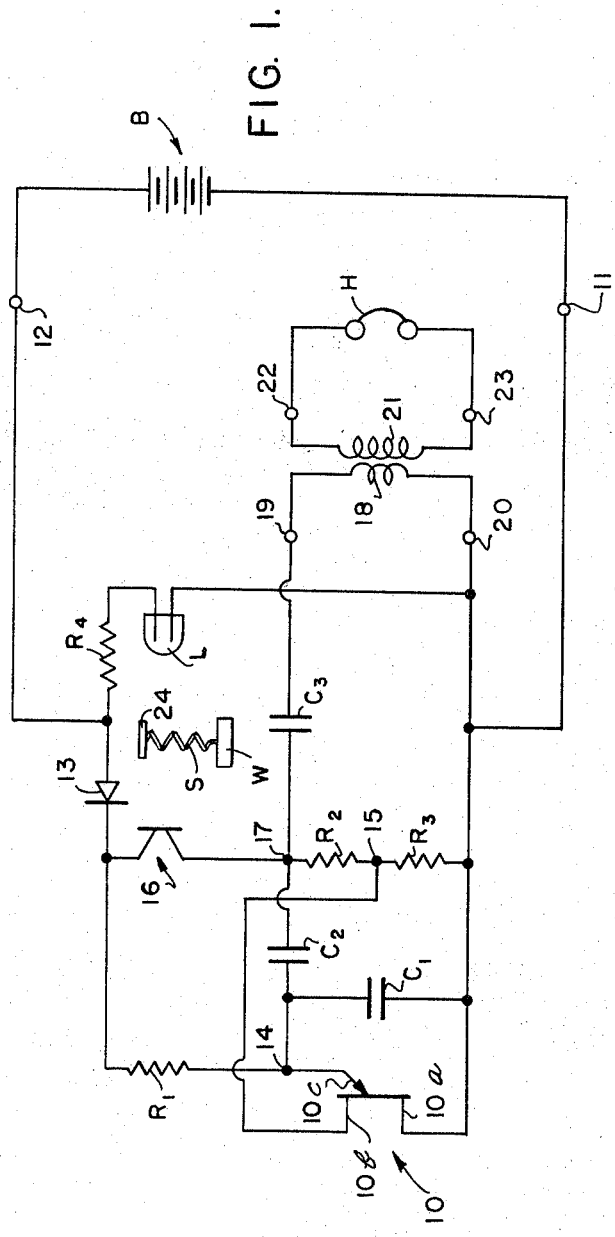
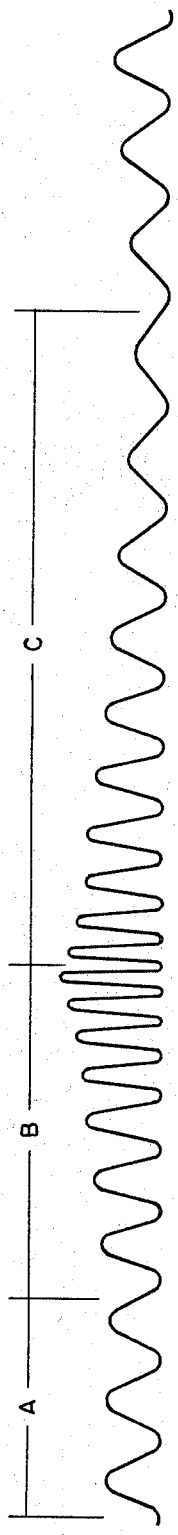
INVENTOR.
DAVID W. KERMODE
BY
P. H. Firsht
ATTORNEY.

United States Patent Office 3,375,376
Patented Mar. 26, 1968

3,375,376
ANTI-INTRUDER DEVICE USING VIBRATION RESPONSIVE MEMBER BETWEEN LIGHT AND PHOTOCELL
David W. Kermode, China Lake, Calif., assignor to the United States of America as represented by the Secretary of the Navy
Filed Feb. 20, 1964, Ser. No. 346,357
3 Claims. (Cl. 250—231)

The invention described herein may be manufactured and used by or for the Government of the United States of America for governmental purposes without the payment of any royalties thereon or therefor.

The present invention relates generally to intruder detecting and alarm systems and more particularly to a detection system which detects and responds to man-induced earth motion to provide an electrical output signal for disclosing the presence of personnel engaged in clandestine activities.

Those concerned with the development of devices for detecting the presence of intruding personnel, such as, for example, troops employed in guerrilla warfare operations, have been confronted with the necessity of providing a simplified and economical detecting system capable of being effectively concealed and operated in dense foliage and rough terrain by relatively inexperienced personnel operating under adverse conditions.

Certain devices such as those utilizing trip-wires, fuzes, and the like have proved inadequate as they must be physically encountered to be activated. Further, various attempts have been made to employ active devices, and devices utilizing infrared capabilities, however, these devices also fail to satisfactorily fulfill existing needs due to certain intrinsic characteristics.

Therefore, the purpose of the instant invention is to provide a simple and economic, passive detector system, which utilizes an electrical oscillator circuit including a single unijunction transistor and a variable resistance device which responds to man-induced earth motion or other vibrations for providing a constantly changing detector output signal, whereby the presence of an intruder may be readily detected as a consequence of the signal's amplitude, as well as at its oscillation frequency rate, being varied in response to induced vibration.

An object of the present invention is to provide a detection system, capable of operating under adverse intruder detecting conditions for indicating the presence of personnel engaged in clandestine activities.

Another object is to provide a simple and economic vibration detection system.

Still another object is to provide a detection system capable of responding to man-induced earth motion for initiating a warning of approaching and obscured personnel.

A further object of the instant invention is to provide an effective motion detecting system utilizing a minimum number of electrical circuit components, which perform a maximum number of electronic functions, whereby both the amplitude and oscillation frequency of an output signal may be varied in response to system imparted motion.

Yet a further object is to provide a small, rugged, easily assembled, economic means for detecting man-induced earth motion during military operations of the type commonly employed in guerrilla warfare.

Other objects, advantages and novel features of the invention will become apparent from the following detailed description of the invention when considered in conjunction with the accompanying drawings wherein:

FIG. 1 is a functional diagrammatic view illustrating the electrical circuit utilized in the present invention; and FIG. 2 is a diagrammatic view illustrating typical changes which may be initiated in the waveform of the output signals of the circuit of FIG. 1.

Referring now to the drawings, there is shown in FIG. 1 an oscillator circuit including a unijunction transistor 10, of a well known design, having a first base electrode $10_a$, a second base electrode $10_b$, and an emitter electrode $10_c$. The base electrode $10_a$ is connected to a negative terminal 11 of a source of operating potential B, while the emitter electrode $10_c$ is connected to a positive terminal 12 of the source B through a resistor or charging resistance $R_1$ and a unilaterally conducting device 13, which serves as a safety device to ensure against an improper connection of the source of potential B with the circuit. A capacitor or capacitance $C_1$ is connected with the emitter electrode $10_c$, at a terminal 14, and to the negative terminal 11 of the potential source so that the capacitor $C_1$ may charge through the resistance $R_1$ and discharge through the electrode in a manner common to unijunction oscillator circuits.

The base electrode $10_b$ is connected with a control circuit at terminal 15 disposed between a pair of resistances $R_2$ and $R_3$, which in turn are connected in circuit series with a photoconductive device or phototransistor 16, of any suitable design, to form a voltage divider network. The series connected resistances $R_2$ and $R_3$ and phototransistor 16 are connected between the terminals 11 and 12 so that the amount of current flowing through the resistances $R_2$ and $R_3$ is dictated by the current flow established through phototransistor 16. Consequently, the voltage values of the potential applied at electrode $10_b$ are dictated by the potential drop experienced across resistances $R_2$ and $R_3$ when a current flow is established through the phototransistor 16.

The frequency response of the circuit depends upon the potential difference existing between the terminal 14 and the electrode $10_b$, as operated through capacitances $C_1$ and $C_2$. The potential at terminal 17 is directly controlled by the ratio of resistances as represented by the series connected resistances $R_2$, $R_3$ and phototransistor 16. The ratio of resistance, represented by resistances $R_2$ and $R_3$, serves to control the changes in potential at $10_b$, relative to the potential changes at terminal 17. Therefore, the frequency and amplitude of the final output signal is dictated by the ratio of potential at 14 and $10_b$, as limited by the resistances $R_1$ and $R_2$.

Terminal 14 is also connected to the voltage divider network, through the second capacitance $C_2$, at the terminal 17 disposed between the resistance $R_2$ and the phototransistor 16. Capacitance $C_2$ normally charges through resistance or phototransistor 16 and discharges through the resistance $R_3$ and electrode $10_b$ of transistor 10 periodically with capacitance $C_1$ and serves to reduce, in effect, the capacitance of the circuit comprising the emitter electrode $10_c$, resistance $R_1$, and capacitance $C_1$ when a current flow is established through the phototransistor 16. Hence, it is to be understood that as a current flow is increased through the phototransistor 16, the magnitude of the differences in voltage values of the potential applied at the base electrode $10_b$ and the emitter electrode $10_c$ is increased, and since the potential between terminals 17 and 11 is increased, the amplitude of the discharge of capacitance $C_1$ through the transistor 10 will be reduced as capacitor $C_2$ is caused to charge. The net result of these effects is to initiate changes in frequency response of the circuit, as controlled by the voltage changes occurring at terminal 17.

A transformer primary coil 18 is connected at terminal 19 to terminal 17 through a third capacitance $C_3$ and at terminal 20 to the negative terminal 11 of the potential source B. Therefore, capacitor $C_3$ operates as a coupling device for passing the pulsing DC component of the signal present at terminal 17, through the coil 18 having an amplitude and frequency as dictated by the amplitude and frequency response of the voltages and circuit components coupled with transistor 10. The signal through the primary coil 18 may now be picked up by a transformer secondary coil 21 and detected by a suitable means such as a headset H connected between secondary coil terminals 22 and 23.

In order to vary the resistance of the phototransistor 16 in accordance with vibration imposed on the system, a constant source of light L is connected in circuit series with a current limiting resistance $R_4$, between the source of potential terminals 11 and 12, so that a resulting quantity of light propagated by the source remains substantially constant.

The source L may be of any suitable design, for example, a conventional neon lamp has been found to function quite satisfactorily. The source L is mounted by any suitable means for propagating a light beam directed to impinge on the photosensitive surface of the phototransistor 16.

Disposed between the source L and the phototransistor 16 is a resilient pendulous coil spring S, which serves to block a substantial quantity of light propagated by the light source L when the spring is in a dormant state, or is at rest. While it is conceivable that a pendulous spring having other configurations might perform satisfactorily, the spring presently utilized comprises a conical spring, having a truncated cone configuration, suspended as a tension spring from a support 24 fixed to the system's housing, not shown.

The specific stored energy factor for the spring may be varied in accordance with the system's intended use as the spring must be capable of being activated from its dormant condition, or state of rest, for detecting vibration. It is to be particularly noted that the purpose of the spring is to block a portion of propagated light in a variable manner to thus vary the quantity of propagated light that ultimately impinges on the photosensitive surface of the phototransistor 16. Therefore, the spring S may perform its intended function by being caused to swing as a pendulum and/or undergo an extension and recovery.

In order to reduce the amplitude of the natural period of the spring, a suitable damping weight W is freely suspended from the lowermost end of the spring so as to substantially eliminate detectable undesired spring motion.

With the system thus assembled, it may be placed near a point of suspected intrusion. If the surface is at rest, so that the spring S is at rest, the signals detected at the headset H will be of a substantially uniform amplitude and at a substantially uniform oscillation frequency, as indicated at A, FIG. 2, due to the fact that the voltage difference between the potential as applied at the base electrode $10_b$ and the emitter electrode $10_c$ remains constant, as does the capacitance of the capacitors $C_1$ and $C_2$. If vibration is now imparted to the system, due to induced motion, the spring S becomes activated and displaced. Assuming the initial motion of the spring S to be in a direction which affords an increased quantity of light to impinge on the photosensitive surface of the phototransistor 16, the resistance of the phototransistor is reduced, consequently, the voltage difference between the potential as applied at $10_b$ and $10_c$ is increased thus the amplitude of the discharge through the unijunction transistor 10 is increased, and the charge on capacitance of $C_1$ and $C_2$ is increased thus initiating an increase in the oscillation frequency rate, as indicated at B, FIG. 2. Once an initial motion is imparted to the spring S, recovery forces cause the spring S to reverse its direction of displacement for effecting an increase in the resistance of the phototransistor 16, whereupon the voltage difference present between the electrodes $10_b$ and $10_c$ is decreased, as well as the charge on the capacitors $C_1$ and $C_2$, thereby effecting a decrease in the amplitude and a decrease in the oscillation frequency as indicated at C in FIG. 2. The system continues to oscillate until the spring S once more assumes a dormant condition or state of rest.

In accordance with the foregoing description, it is to be understood that the present invention provides a simple, economic system, which is capable of effectively functioning under adverse personnel detecting conditions for providing output signals, varying in both amplitude and pulse repetition rate, to warn of the presence of intruders, and which may be grouped and used to effectively "pinpoint" the source of the induced vibrations. Furthermore, while a headset is utilized in the instant invention to detect audible signals, other and more refined devices may be incorporated within the system to provide a visual display. However, a loss in desired simplicity would necessarily accompany such an incorporation and may be found undesirable.

Obviously many modifications and variations of the present invention are possible in the light of the above teachings. It is therefore to be understood that within the scope of the appended claims the invention may be practiced otherwise than as specifically described.

What is claimed is:

1. An intruder detection system for detecting man-induced earth motion, comprising:
   a light source normally generating a constant beam of light;
   a phototransistor disposed in the path of said beam;
   a pendulously supported, resilient light-blocking member disposed in the path of said beam between said source and said phototransistor having its uppermost end secured to an earth supported suspension member and its lowermost end fixed to a damping weight, whereby man-induced earth motion may be transmitted through the suspension member to the light-blocking member for initiating a cyclic displacement thereof for cyclically varying the quantity of light passed from said source to said phototransistor;
   an oscillator circuit, including a unijunction transistor device, normally providing an electrical output signal at a constant frequency and with a constant amplitude;
   an output signal monitoring circuit connected with said oscillator circuit for monitoring said output signal, whereby imposed variation in the output signal's frequency and amplitude may be detected; and
   means connected between said phototransistor and said oscillator circuit adapted to impose a variation in both the frequency and the amplitude of the output signal of the oscillator circuit in response to changes in quantities of light passed from said source to said phototransistor when a cyclic displacement of the light-blocking member is initiated.

2. In a motion detection system, means including:
   a unijunction transistor oscillator circuit for supplying an oscillating electrical output signal;
   a continuous light emitting light source for producing a beam of light;
   a light responsive device including an electrical current conducting variable resistance means disposed within the path of said beam so that the light beam may be caused to impinge thereon;
   means adapted to vary the quantity of light of said beam impinging on said device in response to externally induced system vibrations; and
   an electrical circuit including a voltage divider network and capacitance coupling means connecting said light responsive device with the oscillator circuit at the emitter electrode and one base electrode of the unijunction transistor for varying both amplitude and frequency of the oscillator output signal in response to induced system vibration.

3. A motion detecting circuit comprising:
   a direct current potential source including a positive and a negative terminal;

a unijunction transistor having a first base electrode, a second base electrode, and an emitter electrode;

means connecting said first base electrode to said negative terminal;

a voltage divider network including a first and second circuit series connected resistance means;

means connecting said second base electrode to the voltage divider network between the first and second circuit series connected resistance means;

means connecting the voltage divider network with the negative terminal of said source;

a junction terminal;

means connecting the voltage divider network with said junction terminal so that the first and second resistors are connected between the negative terminal and the junction terminal;

means including a first capacitance means connecting said emitter electrode with said junction terminal;

means including a charging resistance means connecting said emitter electrode with the positive terminal of said potential source;

a photosensitive variable resistance means connected in circuit series between the positive terminal of said potential source and said junction terminal;

a light source adapted to direct a beam of light on the photosensitive surface of said photosensitive variable resistance means;

a resilient coiled tension spring disposed in a light blocking disposition within the path of said beam and being adapted to be displaced under the influence of induced vibrations whereby the amount of light passed to said surface may be varied as the spring is displaced;

a transformer primary coil;

means including a second capacitance means connecting one end of said coil with said junction terminal;

a third capacitance means connected between said emitter electrode and said negative terminal of said potential source; and a transformer secondary coil operatively associated with said primary coil for providing a primary coil induced current output signal of uniform amplitude and frequency when said spring is at rest and an output signal of varied amplitude and frequency when said spring is displaced under influence of induced vibration.

References Cited
UNITED STATES PATENTS

| | | | |
|---|---|---|---|
| 3,159,750 | 12/1964 | Kazan | 250—231 |
| 3,168,729 | 2/1965 | Volberg | 340—384 |
| 3,221,317 | 11/1965 | Ferrigno | 340—384 |

RALPH G. NILSON, *Primary Examiner.*

M. ABRAMSON, *Assistant Examiner.*